United States Patent
Wang et al.

(10) Patent No.: US 11,924,594 B2
(45) Date of Patent: Mar. 5, 2024

(54) METHOD, APPARATUS AND SYSTEM FOR TRANSMITTING OMCI MESSAGES

(71) Applicant: Nokia Solutions and Networks Oy, Espoo (FI)

(72) Inventors: Xin Wang, Shanghai (CN); Erik Duys, Antwerp (BE); Jian Li, Shanghai (CN); Ilias Gravalos, Kifisia (GR); Jie Liu, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 195 days.

(21) Appl. No.: 17/567,325

(22) Filed: Jan. 3, 2022

(65) Prior Publication Data

US 2022/0217457 A1 Jul. 7, 2022

(30) Foreign Application Priority Data

Jan. 4, 2021 (CN) .......................... 202110003903.5

(51) Int. Cl.
- *H04B 10/00* (2013.01)
- *H04B 10/27* (2013.01)
- *H04Q 11/00* (2006.01)

(52) U.S. Cl.
CPC ......... *H04Q 11/0067* (2013.01); *H04B 10/27* (2013.01); *H04Q 2011/0064* (2013.01); *H04Q 2011/0079* (2013.01)

(58) Field of Classification Search
CPC ....... H04Q 11/0067; H04Q 2011/0064; H04Q 2011/0079; H04Q 2011/0088; H04Q 11/0062; H04B 10/27; H04L 41/0806; H04L 67/10
See application file for complete search history.

(56) References Cited

U.S. PATENT DOCUMENTS

| | | | |
|---|---|---|---|
| 2016/0112778 A1* | 4/2016 | Wang | H04Q 11/0067 398/45 |
| 2018/0013625 A1* | 1/2018 | Gao | H04L 41/344 |
| 2018/0048739 A1* | 2/2018 | Eddleston | H04Q 11/0067 |
| 2021/0211788 A1* | 7/2021 | Li | H04L 41/0803 |
| 2022/0217457 A1* | 7/2022 | Wang | H04B 10/27 |

(Continued)

FOREIGN PATENT DOCUMENTS

| | | |
|---|---|---|
| CN | 111901705 A | 11/2020 |
| WO | WO-2017/177619 A1 | 10/2017 |

OTHER PUBLICATIONS

Search Report dated May 30, 2022 issued in corresponding European patent application No. 21218305.7.

*Primary Examiner* — Agustin Bello (74) *Attorney, Agent, or Firm* — HARNESS, DICKEY & PIERCE, P.L.C.

(57) ABSTRACT

The present disclosure provides a method, apparatus and system for transmitting OMCI messages. The method includes receiving an OMCI message from a cloud server, wherein the cloud server supports vOMCI; judging whether the received OMCI message is associated with device information of the optical line terminal, if so, obtaining device association information corresponding to the received OMCI message, filling the device association information into the received OMCI message, and sending the filled OMCI message to the optical network terminal, otherwise, sending the received OMCI message directly to the optical network terminal.

11 Claims, 4 Drawing Sheets

(56) References Cited

U.S. PATENT DOCUMENTS

2022/0231907 A1* 7/2022 Li .................... H04L 41/0213
2022/0272053 A1* 8/2022 Xu .................... H04B 10/2507
2023/0171170 A1* 6/2023 Goenka ............... H04L 43/065
                                                        709/224

* cited by examiner

METHOD, APPARATUS AND SYSTEM FOR TRANSMITTING OMCI MESSAGES

CROSS-REFERENCE TO RELATED APPLICATIONS

This application claims priority to and the benefit of Chinese Patent Application No. 202110003903.5 filed on Jan. 4, 2021, the entire contents of each of which are incorporated herein by reference.

TECHNICAL FIELD

This disclosure relates to the field of circuit technology and in particular to a technical solution for transmitting OMCI (Optical Network Unit Management and Control Interface) messages.

BACKGROUND

OMCI is a configuration transmission channel defined in the GPON (Gigabit-Capable Passive Optical Networks) standard, and is used for management and control of ONT (Optical Network Terminal) (also known as ONU, Optical Network Unit or Optical Network Device) by OLT (Optical Line Terminal) in GPON network.

In the prior art, the OMCI protocol stack is deployed in OLT. The WT-451 is discussing the vOMCI (virtual OMCI) function, which will move the OMCI protocol stack out of the OLT device and deploy it in the cloud, and since most of ME (Managed Entity) contents supported by the OMCI protocol are directly from the configuration of the operators, deploying the OMCI protocol stack in the cloud can reduce the complexity of the OLT device and improve the flexibility of different operators to deploy the OMCI protocol stack. However, the vOMCI is still at beginning stage at present, and all MEs supported by the OMCI protocol should be implemented in the vOMCI function as discussed so far.

However, there are some MEs (Management Entities) supported by the OMCI protocol that are associated with to device information of the OLT, such as OLT-G ME, its content "time of day information" requires the specified GEM (GPON Encapsulation Mode) or XGEM (XGPON Encapsulation Mode) superframe information and the associated time information, these required information can only be obtained from the OLT, and based on G.984.3/987.3/989.3, the "time of day information" should arrive at the ONU at a specific time (before the superframe arriving at ONU, G.984.3/987.3/989.3 recommended within 10 seconds), otherwise it will time out. The current discussion of vOMCI has focused on configuring OMCI MEs, without considering this highly device-dependent and time-sensitive ME.

SUMMARY

The purpose of the present disclosure is to provide a method, apparatus and system for transmitting OMCI messages for vOMCI.

According to an aspect of the present disclosure, there is provided a method for transmitting OMCI messages in an optical line terminal, wherein the method comprises:
receiving an OMCI message from a cloud server, wherein the cloud server supports vOMCI;
judging whether the received OMCI message is associated with device information of the optical line terminal, if so, obtaining device association information corresponding to the received OMCI message, filling the device association information into the received OMCI message, and sending the filled OMCI message to the optical network terminal, otherwise, sending the received OMCI message directly to the optical network terminal.

According to another aspect of the present disclosure, there is provided a method for transmitting OMCI messages in a cloud server, wherein the method comprises:
generating an OMCI message, wherein, if the OMCI message is associated with device information of the optical line terminal, the OMCI message does not carry valid device association information associated with the device information of the optical line terminal;
sending the OMCI message to the optical line terminal.

According to another aspect of the present disclosure, there is provided a first apparatus for transmitting OMCI messages in an optical line terminal, wherein the first apparatus comprises:
means for receiving an OMCI message from a cloud server, wherein the cloud server supports vOMCI;
means for judging whether the received OMCI message is associated with device information of the optical line terminal, if so, obtaining device association information corresponding to the received OMCI message, filling the device association information into the received OMCI message, and taking the filled OMCI message as the OMCI message to be sent, otherwise, taking the received OMCI message as the OMCI message to be sent directly.

According to another aspect of the present disclosure, there is provided a second apparatus for transmitting OMCI messages in a cloud server, the cloud server supports virtual OMCI, wherein the second apparatus comprises:
means for generating an OMCI message, wherein, if the OMCI message is associated with device information of the optical line terminal, the OMCI message does not carry valid device association information associated with the device information of the optical line terminal;
means for sending the OMCI message to the optical line terminal.

According to another aspect of the present disclosure, there is provided a system for transmitting OMCI messages, wherein the system comprises a cloud server, an optical line terminal, and an optical network terminal, the optical line terminal comprising the first apparatus as described in the present disclosure, and the cloud server comprising the second apparatus as described in the present disclosure.

According to another aspect of the present disclosure, there is provided an optical line terminal, wherein the optical line terminal comprises:
a memory for storing one or more programs;
one or more processors connected with the memory, the one or more programs, when executed by the one or more processors, cause the one or more processors to perform the following operations:
receiving an OMCI message from a cloud server, wherein the cloud server supports vOMCI;
judging whether the received OMCI message is associated with device information of the optical line terminal, if so, obtaining device association information corresponding to the received OMCI message, filling the device association information into the received OMCI message, and sending the filled OMCI message to the optical network terminal, otherwise, sending the received OMCI message directly to the optical network terminal.

According to another aspect of the present disclosure, there is provided a cloud server, wherein the cloud server comprises:

a memory for storing one or more programs;
one or more processors connected with the memory,
the one or more programs, when executed by the one or more processors, cause the one or more processors to perform the following operations:
generating an OMCI message, wherein, if the OMCI message is associated with device information of the optical line terminal, the OMCI message does not carry valid device association information associated with the device information of the optical line terminal;
sending the OMCI message to the optical line terminal.

According to another aspect of the present disclosure, there is provided a computer readable storage medium storing a computer program, which when executed by a processor, cause the processor to perform the following operations:

receiving an OMCI message from a cloud server, wherein the cloud server supports vOMCI;
judging whether the received OMCI message is associated with device information of the optical line terminal, if so, obtaining device association information corresponding to the received OMCI message, filling the device association information into the received OMCI message, and sending the filled OMCI message to the optical network terminal, otherwise, sending the received OMCI message directly to the optical network terminal.

According to another aspect of the present disclosure, there is provided a computer readable storage medium storing a computer program, which when executed by a processor, cause the processor to perform the following operations:

generating an OMCI message, wherein, if the OMCI message is associated with device information of the optical line terminal, the OMCI message does not carry valid device association information associated with the device information of the optical line terminal;
sending the OMCI message to the optical line terminal.

Compared with the prior art, the present disclosure has the following advantages: for OMCI messages requiring OLT assistance, by generating OMCI messages that do not carry valid device association information in the cloud server and filling the corresponding device association information into the OMCI messages in the OLT, the integrity of the vOMCI can be maintained and it is ensured that all OMCI messages can reach the ONT before a specific superframe reaches the ONT.

BRIEF DESCRIPTION OF THE DRAWINGS

Other features, objects and advantages of the present disclosure will become more apparent from a reading of the detailed description of non-limiting embodiments made with reference to the following accompanying drawings.

Same or similar reference numbers in the drawings represent the same or similar components.

DETAILED DESCRIPTION

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be rearranged. The processes may be terminated when its operations are completed, but may also have additional steps not included in the figure. The processes may correspond to methods, functions, procedures, subroutines, subprograms, etc.

The "device" mentioned in this context refers to the smart electronic device that can carry out numerical computations and/or logical computations and other predetermined processing procedures through running predetermined programs or instructions, and may comprise a processor and a memory. It is by the processor that the program instructions prestored in the memory are executed to carry out the predetermined processing procedures, or by Application Specific Integrated Circuit (ASIC), Field Programmable Gate Array (FPGA), Digital Signal Processor (DSP) and other like hardware that the predetermined processing procedures are carried out, or some combination of the two mentioned scenarios.

The methods (some of which are showed by flowcharts) discussed infra may be implemented through hardware, software, firmware, middleware, microcode, hardware description language or any combination thereof. When they are implemented with software, firmware, middleware or microcode, the program code or code segment for executing essential tasks may be stored in a machine or a computer readable medium (e.g., storage medium). (One or more) processors may implement essential tasks.

The specific structures and function details disclosed here are only representative, for a purpose of describing the exemplary embodiments of the present disclosure. The present disclosure, however, may be specifically implemented through many alternative embodiments, and should not be construed as limited to only the embodiments illustrated here.

It will be understood that although terms "first," "second" might be used here to describe respective units, these units should not be limited by these terms. Use of these terms is only for distinguishing one unit from another. For example, without departing from the scope of the exemplary embodiments, the first unit may be referred to as the second unit, and similarly the second unit may be referred to as the first unit. The term "and/or" used here includes any and all combinations of one or more associated items as listed.

The terms used here are only for describing preferred embodiments, not intended to limit exemplary embodiments. Unless otherwise indicated, singular forms "a" or "one" used here further intends to include plural forms. It should also be appreciated that the terms "comprise" and/or "include" used here prescribe existence of features, integers, steps, operations, units and/or components as stated, but do not exclude existence or addition of one or more other features, integers, steps, operations, units, components, and/or a combination thereof.

It should also be noted that in some alternative embodiments, the functions/actions as mentioned may occur in an order different from what is indicated in the drawings. For example, dependent on the functions/actions involved, two successively illustrated diagrams may be executed substantially simultaneously or in a reverse order sometimes.

The purpose of this disclosure is to provide a technical solution for transmitting OMCI messages, a complete OMCI protocol stack is deployed in the cloud server of this disclosure to support virtual vOMCI function. The disclosure divides OMCI messages into two types, one is "OMCI messages associated with the device information of the optical line terminal" (also referred to as "OMCI messages requiring device assistance" in this disclosure), and the other One is "OMCI messages that are not associated with the device information of the optical line terminal" (also referred to as "normal OMCI messages" in this disclosure). Wherein, "OMCI messages associated with the device information of the optical line terminal" means OMCI messages generated according to MEs associated with the device information of the OLT, i.e. OMCI messages requiring the assistance of the OLT; the content of the MEs associated with the device information of the OLT is closely related to the device information of the OLT or needs to be determined by the device information of the OLT, optionally, MEs associated with the device information of the OLT include, but are not limited to, MEs that need to retrieve information from the OLT device side, MEs that need to update information on the OLT device side, time-sensitive MEs, etc.; for example, OLT-G ME whose content "time of day information" requires specified GEM or XGEM superframe information and associated time information, this information can only be obtained from the OLT device, so the OLT-G ME is associated with the device information of the OLT. In some embodiments, the OLT may retain the full OMCI stack, or may only support some OMCI functions (such as only some simple OMCI message sending and receiving functions), or may not need to retain the OMCI stack at all, and in practice, the OMCI functions supported in the OLT can be designed based on actual requirements.

In some embodiments, the OLT includes a part of the management entities supported by the OMCI protocol, the part of the management entities is associated with the device information of the OLT, the cloud server supports vOMCI, the cloud server includes another part of the management entities supported by the OMCI protocol, i.e., a part of the management entities supported by the OMCI protocol is retained in the OLT device, and another part of the management entities are removed from the OLT device and deployed in the cloud server, OMCI messages associated with the device information of the OLT are generated by the OLT according to one or more management entities in the part of the management entities, and OMCI messages that are not associated with the device information of the OLT are generated by the cloud server based on the another part of the management entities. In some embodiments, the cloud server supports vOMCI, the cloud server includes all management entities supported by the OMCI protocol, OMCI messages associated with the device information of the OLT are generated by the cloud server and filled in the OLT, normal OMCI messages are generated directly by the cloud server, the specific implementation will be described in detail in subsequent embodiments. In some embodiments, the OLT includes a controller that may be used to control the generation and/or filling of OMCI messages, for example, the controller may be used to control the generation of OMCI messages associated with the device information of the OLT in the OLT, or, if an OMCI messages associated with the device information of the OLT is generated by the cloud server (the OMCI message generated by the cloud server does not carry valid device association information associated with the device information of the OLT), after receiving the OMCI message generated from the cloud server that does not carry valid device association information, the OLT passes the OMCI message to the controller, the controller obtains the device association information corresponding to the OMCI message from the OLT device, and fills the device association information into the OMCI message to obtain the OMCI message carrying valid device association information to be sent to the ONT.

The present disclosure is described in further detail below in conjunction with the accompanying drawings.

Figure 1:
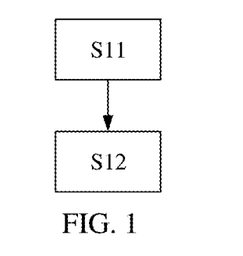
FIG. 1 shows a flow diagram of a method for transmitting OMCI messages in an optical line terminal according to an embodiment of the present disclosure.

FIG. 1 shows a flow diagram of a method for transmitting OMCI messages in an optical line terminal according to an embodiment of the present disclosure. The method of this embodiment comprises step S11 and step S12. In step S11, the optical line terminal receives an OMCI message sent by a cloud server, wherein the cloud server supports vOMCI; in step S12, the optical line terminal judges whether the received OMCI message is associated with the device information of the optical line terminal, if so, obtains device association information corresponding to the received OMCI message, fills the device association information into the received OMCI message, and sends the filled OMCI message to the optical network terminal, otherwise, sends the received OMCI message directly to the optical network terminal.

In step S11, the optical line terminal receives an OMCI message sent by a cloud server. In some embodiments, the OMCI message sent by the cloud server may be an OMCI message that does not carry valid device association information that requires device assistance, or it may be a normal OMCI message; for example, the cloud server generates an OLT-G that does not carry valid superframe and ToD (Time of Day) information, and sends the OLT-G that does not carry valid superframe and ToD information to the OLT through the interface between the cloud server and the OLT, the OLT receives the OLT-G. In some embodiments, the corresponding field in the OMCI message requiring device assistance generated by the cloud server carries invalid device association information or other invalid information; in some embodiments, the corresponding field in the OMCI message associated with the device information of the OLT generated by the cloud server is empty. In some embodiments, there is only one interface between the cloud server and the OLT for the transmission of OMCI messages, and this interface is used to transmit all OMCI messages; in some embodiments, there is a first interface for transmitting normal OMCI messages and a second interface for transmitting OMCI messages requiring device assistance between the cloud server and the OLT.

In step S12, the optical line terminal judges whether the received OMCI message is associated with the device information of the optical line terminal, if so, obtains device association information corresponding to the received OMCI message, fills the device association information into the received OMCI message, and sends the filled OMCI message to the optical network terminal, otherwise, sends the received OMCI message directly to the optical network terminal. In some embodiments, the corresponding field in the OMCI message requiring device assistance generated by the cloud server carries invalid device association information or other invalid information, after receiving the OMCI message, if the OLT determines that the OMCI message is associated with the device information of the optical line terminal, it obtains valid device association information and fills into the corresponding field (that is, equivalent to replacing the original invalid information); in some embodiments, the corresponding field in the OMCI message requiring device assistance generated by the cloud server is empty, after receiving the OMCI message, if the OLT determines that the OMCI message is associated with the device information of the optical line terminal, it obtains valid device association information and fills into the corresponding field. In some embodiments, the OLT obtains the device association information required by the OMCI message associated with the device information of the OLT from the hardware adapter (HW Adaptor) therein, and the hardware adapter may obtain the required device association information from the corresponding hardware, for example, the OLT receives an OLT-G that does not carry valid superframe and ToD information sent by the cloud server, after recognizing that the OLT-G is an OMCI message requiring device assistance, the OLT obtains the superframe and ToD information from the hardware adapter to fill the OLT-G, the hardware adapter obtains that superframe and ToD information from the ToD hardware. In some embodiments, judging whether the received OMCI message is associated with the device information of the optical line terminal, if so, it is handed over to a specific module to perform the filling operation on the OMCI message to send the filled OMCI message to the ONT through the vOMCI hardware path, otherwise, the OMCI message is sent directly to the ONT through the vOMCI hardware path. It should be noted that when the OMCI message carrying valid device association information leaves the OLT after the filling is completed, it follows the same path as all other normal OMCI messages. Therein, the OLT may use any feasible means to judge whether the received OMCI message is associated with the device information of the OLT; for example, judge whether the OMCI message is associated with the device information of the OLT through the interface source of the OMCI message; for another example, by defining a new attribute in the OMCI message to indicate whether it is associated with the device information of the OLT, the OLT can judge whether the OMCI message is associated with the device information of the OLT by identifying the attribute in the OMCI message; for another example, the content of the OMCI message may be parsed to identify whether it is associated with the device information of the OLT. In these embodiments, since the device association information is sent directly to the ONT after being filled by the OLT, it can be consistent with the timing of the device-based OMCI function, which proves that the timing requirements of G.984.3, G.987.3, G.989.3 are met, and since all OMCI messages are generated through vOMCI, the integrity of the OMCI stack is well maintained.

In some embodiments, there is a first interface for transmitting OMCI messages that are not associated with the device information of the optical line terminal and a second interface for transmitting OMCI messages associated with the device information of the optical line terminal between the optical line terminal and the cloud server, the judging whether the received OMCI message is associated with device information of the optical line terminal, comprising: determining, if the received OMCI message is from the second interface, that the received OMCI message is associated with the device information of the optical line terminal; determining, if the received OMCI message is from the first interface, that the received OMCI message is not associated with the device information of the optical line terminal. In these embodiments, a new second interface is introduced between the vOMCI and the pOLT (Physical OLT), which will be used for OMCI messages dependent on the OLT when the OMCI messages (such as OLT-G) need the help of the OLT.

In some embodiments, the judging whether the received OMCI message is associated with device information of the optical line terminal, comprising: judging whether the received OMCI message is associated with device information of the optical line terminal by analyzing the content information in the received OMCI message. As an example, the cloud server sends the OMCI message generated by the cloud server to the OLT through an interface between the cloud server and the OLT, after receiving the OMCI message, the OLT recognizes that the OMCI message is an OLT-G by checking its content, and then determines that the OMCI message is associated with the device information of the OLT.

In some embodiments, the obtaining device association information corresponding to the received OMCI message, filling the device association information into the received OMCI message, and sending the filled OMCI message to the optical network terminal, comprising: obtaining, if the received OMCI message is an OLT-G that does not valid superframe and ToD information, valid superframe and ToD information corresponding to the OLT-G, filling the valid superframe and ToD information into the OLT-G, and sending the filled OLT-G to the optical network terminal. In some embodiments, the valid superframe and ToD information refers to the specified superframe information (GEM or XGEM superframe information) and ToD information required by the OLT-G, and the filled OLT-G carries the valid superframe and ToD information.

In some embodiments, the step S12 comprises: judging whether the received OMCI message is associated with device information of the optical line terminal by a vOMCI adapter, if so, transmitting the received OMCI message from the vOMCI adapter to an OMCI assistor, obtaining the device association information corresponding to the received OMCI message from a hardware adapter module by the OMCI assistor, and filling the device association information into the received OMCI message, and sending the filled OMCI message to the optical network terminal via the vOMCI hardware path, otherwise sending the received OMCI message directly to the optical network terminal through vOMCI hardware path, wherein the vOMCI adapter has the function of receiving and adapting OMCI message, wherein the OMCI assistor is designed to receive OMCI messages requiring device assistance sent by the vOMCI adapter, fill these OMCI messages, and then send the filled OMCI messages to be sent to the vOMCI normal path, by introducing a new OMCI assistor in the OLT, the corresponding device association information can be filled into the OMCI messages requiring device assistance in the OLT, thereby ensuring that timing requirements are met and the integrity of the vOMCI can be maintained; in some embodiments, the aforementioned controller in the OLT can also be designed as an OMCI assistor. In some embodiments, the hardware adapter module is used to obtain the required device association information from the corresponding hardware of the OLT and provide it to the OMCI assistor, such as obtaining the superframe and ToD information from the ToD hardware and provide it to the OMCI assistor, so that the OMCI assistor fills the superframe and ToD information into the OLT-G. In some embodiments, the vOMCI hardware path is OMCC (Optical Network Unit Management and Control Channel) on the OLT.

In some embodiments, a PON buffer is deployed in the OMCI assistor, the device association information corresponding to a plurality of OMCIs is obtained by batch processing the plurality of OMCI messages in the PON buffer, so as to fill the plurality of OMCI messages in batches. By deploying the buffer of each PON in the OMCI assistor, large size and burst OMCI messages requiring device assistance can be processed, for example, when there are a large number of burst OLT-G in the PON buffer, the batch retrieval function can be used to obtain the superframe and ToD information corresponding to the OLT-G messages, and to complete the filling for the OLT-G.

Figure 2:
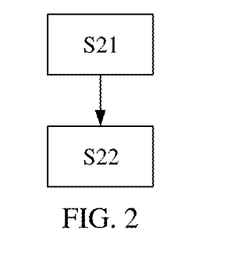
FIG. 2 shows a flow diagram of a method for transmitting OMCI messages in a cloud server according to an embodiment of the present disclosure.

FIG. 2 shows a flow diagram of a method for transmitting OMCI messages in a cloud server according to an embodiment of the present disclosure, the cloud server is deployed with a complete OMCI protocol stack to support virtual vOMCI function. The method of this embodiment comprises step S21 and step S22. In step S21, the cloud server generates an OMCI message, wherein, if the OMCI message is associated with the device information of the optical line terminal, the OMCI message does not carry valid device association information associated with the device information of the optical line terminal; in step S22, the cloud server sends the OMCI message to the optical line terminal.

In step S21, the cloud server generates an OMCI message, wherein, if the OMCI message is associated with the device information of the optical line terminal, the OMCI message does not carry valid device association information associated with the device information of the optical line terminal.

In some embodiments, the cloud server includes all MEs supported by the OMCI protocol, and the cloud server may generate OMCI messages that do not carry valid device association information based on MEs associated with the device information of the OLT, so as to fill the OMCI messages in the OLT, or the cloud server may also generate normal OMCI messages based on MEs that are not associated with the device information of the OLT, for example, the cloud server periodically generates OLT-G OMCI messages for the ONT to enable the ToD function at a fixed (or configurable) frequency. In some embodiments, the corresponding field in the OMCI message associated with the device information of the OLT which is generated by the cloud server carries invalid device association information or other invalid information. In some embodiments, the corresponding field in the OMCI message associated with the device information of the OLT which is generated by the cloud server is empty. In some embodiments, for MEs associated with OLT, if such MEs are also deployed in OLT (i.e., the OLT also has the ability to generate corresponding OMCI messages based on such MEs), the cloud server may determine whether the corresponding OMCI message is generated by the cloud server or by the OLT based on its settings information or preset database or negotiation results with the OLT.

In some embodiments, the OMCI message is an OLT-G that does not carry valid superframe and ToD information, the cloud server generates an OLT-G that does not carry valid superframe and ToD information, and the OLT fills the valid superframe and ToD information into the OLT-G after receiving the OLT-G.

In step S22, the cloud server sends the OMCI messages to the optical line terminal.

In some embodiments, there is only one interface between the cloud server and the OLT for transmitting OMCI messages, which is used for transmitting all OMCI messages, that is, normal OMCI messages or OMCI messages requiring OLT assistance are sent to the OLT through this interface.

In some embodiments, there is a first interface for transmitting OMCI messages that are not associated with the device information of the optical line terminal and a second interface for transmitting OMCI messages associated with the device information of the optical line terminal between the optical line terminal and the cloud server, the step S22 comprises: if the OMCI message is associated with the device information of the optical line terminal, sending the OMCI message to the optical line terminal via the second interface, otherwise sending the OMCI message to the optical line terminal via the first interface. In some embodiments, the cloud server identifies whether the OMCI message is associated with the device information of the OLT according to the content of the OMCI message; in some embodiments, the cloud server determines whether the OMCI message is associated with the device information of the OLT by querying a preset database.

According to the solution of this disclosure, for OMCI messages requiring OLT assistance, by generating OMCI messages that do not carry valid device association information in the cloud server and filling the corresponding device association information into the OMCI messages in the OLT, the integrity of the vOMCI can be maintained and it is ensured that all OMCI messages can reach the ONT before a specific superframe reaches the ONT, thereby meeting the timing requirements.

Figure 3:
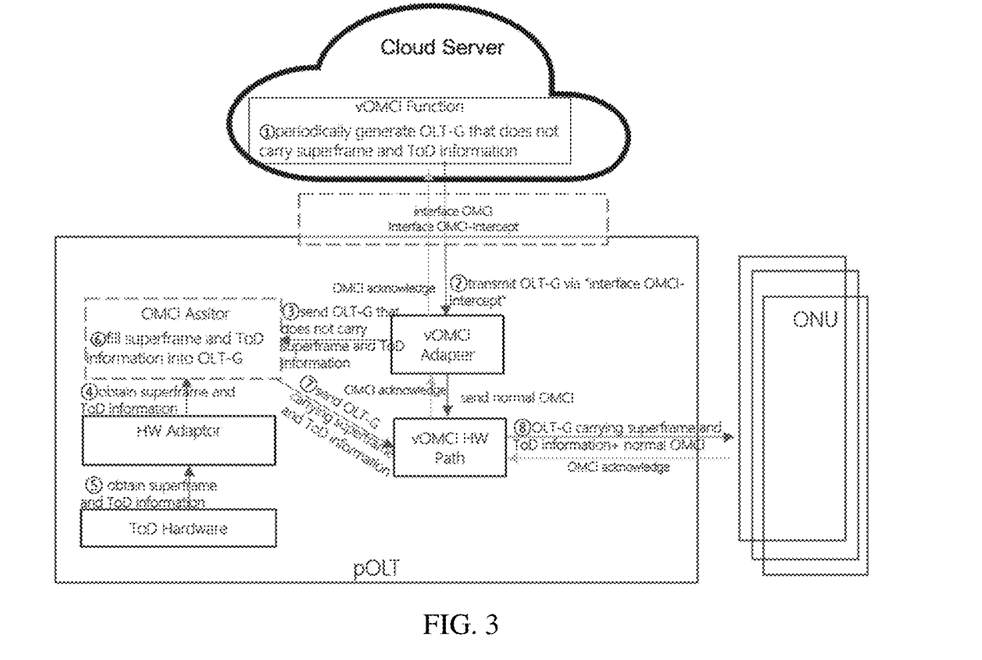
FIG. 3 shows a schematic diagram of a system architecture for transmitting OMCI messages of an example of the present disclosure.

FIG. 3 shows a schematic diagram of a system architecture for transmitting OMCI messages of an example of the present disclosure. The system includes a Cloud Server, a pOLT, and an ONU. Wherein, the Cloud Server includes a vOMCI Function module, and the vOMCI Function module is used to generate OMCI messages. Wherein, the pOLT includes a vOMCI Adapter, a vOMCI hardware path (vOMCI HW Path), an OMCI Assistor, a hardware adapter (HW Adapter), and ToD Hardware. It should be noted that this example takes OLT-G as an example, so only TOD Hardware is shown, the person skilled in the art should understand that pOLT also includes other hardware, and the solution of this disclosure is not limited to OLT-G, for other OMCI messages requiring OLT assistance, the hardware adapter may also obtain corresponding device association information from other hardware. Wherein, there are interfaces "interface OMCI" and "interface OMCI-Intercept" between the cloud server and the pOLT, the interface "interface OMCI" is used for transmitting normal PMCI messages, and the interface "interface OMCI-Intercept" is used for transmitting OMCI messages requiring OLT assistance (such as OLT-G). Based on the system architecture shown in FIG. 3, the detailed process of OLT-G OMCI message generation and transmission is as follows: 1) The vOMCI Function module generates OLT-G OMCI message for the ONT to enable the ToD function at a fixed (or configurable) frequency (at this point the OLT-G does not carry valid superframe and ToD information). 2) The vOMCI sends the OLT-G OMCI message via the interface "interface OMCI-Intercept"; it should be noted that the normal OMCI will be transmitted between the vOMCI and the pOLT via the interface "interface OMCI". 3) The vOMCI Adapter sends the OLT-G from interface "interface OMCI-Intercept" to the OMCI Assistor; it should be noted that the vOMCI Adapter sends the normal OMCI messages from the interface "interface OMCI" directly to the vOMCI hardware path for sending to the ONU. 4) The OMCI Assistor obtains the superframe and ToD information from the hardware adapter. 5) The hardware adapter obtains the superframe and ToD information from the ToD Hardware. 6) Once the superframe and ToD information are obtained, the OMCI Assistor will fill the obtained superframe and Tod information in the OLT-G OMCI. 7) The OMCI Assistor sends the OLT-G with valid superframe and ToD information to the vOMCI hardware path. 8) The vOMCI hardware path sends the OLT-G with valid superframe and ToD information to the ONU, and when the OLT-G leaves the OLT, it follows the same path as all other normal OMCI messages. It should be noted that, after receiving the OMCI message send by the pOLT, the ONU will send an OMCI acknowledge message to the vOMCI hardware path in the pOLT, the vOMCI hardware path sends the OMCI acknowledge message to the cloud server through the vOMCI Adapter. It should be noted that, the buffer of each PON can be deployed inside the OMCI assistor, and the batch retrieval function can be deployed at steps 4, 5 and 6 shown in FIG. 3 to handle large size and burst OMCI messages requiring OLT assistance.

Figure 4:
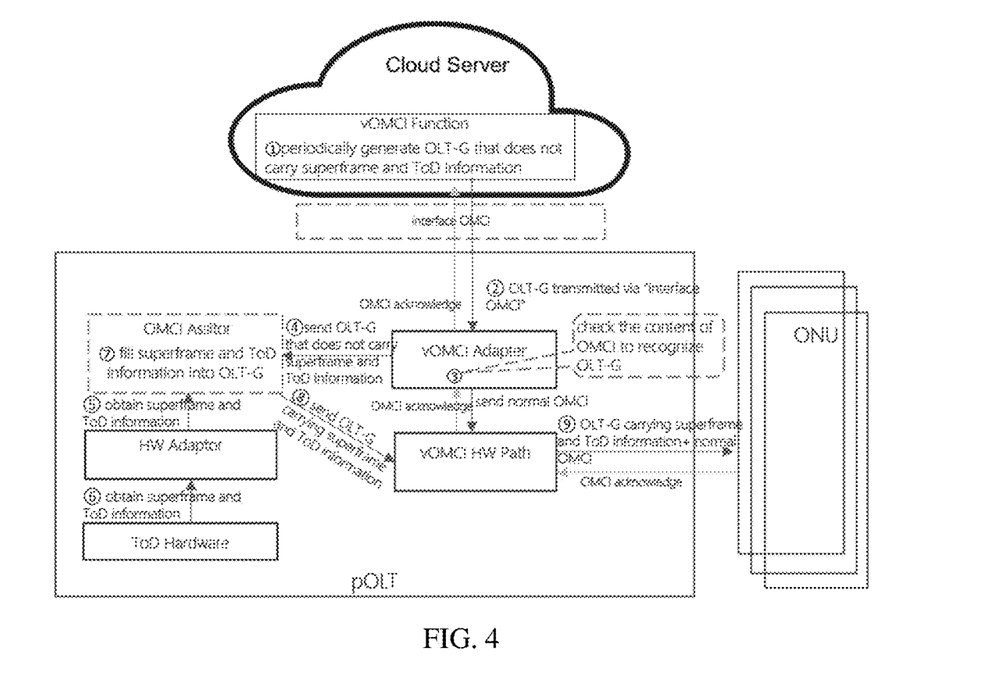
FIG. 4 shows a schematic diagram of a system architecture for transmitting OMCI messages of another example of the present disclosure.

FIG. 4 shows a schematic diagram of a system architecture for transmitting OMCI messages of another example of the present disclosure. The system includes a Cloud Server, a pOLT, and an ONU. wherein the Cloud Server includes a vOMCI Function module, the pOLT includes a vOMCI Adapter, a vOMCI hardware path, a OMCI Assistor, a hardware adapter, and ToD Hardware, the related description please refer to FIG. 3. Wherein, there is only an interface "interface OMCI" between the cloud server and the pOLT, which is used for transmitting all OMCI messages. It should be noted that the transmission process of the normal OMCI message is the same as described in FIG. 3 and will not be repeated here. Based on the system architecture shown in FIG. 4, the detailed process of OLT-G OMCI message generation and transmission is as follows: 1) The vOMCI Function module generates OLT-G OMCI message for the ONT to enable the ToD function at a fixed (or configurable) frequency (at this point the OLT-G does not carry valid superframe and ToD information). 2) The vOMCI sends the OLT-G OMCI message via the interface "interface OMCI". 3) The vOMCI Adapter recognizes the OMCI message as OLT-G by checking the content of the OMCI message. 4) The vOMCI Adapter sends the OLT-G without valid superframe and ToD information to the OMCI Assistor. 5) The OMCI Assistor obtains the superframe and ToD information from the hardware adapter. 6) The hardware adapter obtains the superframe and ToD information from the ToD Hardware. 7) Once the superframe and ToD information is obtained, the OMCI Assistor will fill the obtained superframe and Tod information in the OLT-G OMCI. 8) The OMCI Assistor sends the OLT-G with valid superframe and ToD information to the vOMCI hardware path. 9) The vOMCI hardware path sends the OLT-G with valid superframe and ToD information to the ONU.

Figure 5:
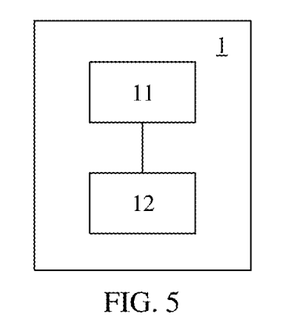
FIG. 5 shows a structural diagram of a first apparatus for transmitting OMCI messages in an optical line terminal according to an embodiment of the present disclosure.

FIG. 5 shows a structural diagram of a first apparatus for transmitting OMCI messages in an optical line terminal according to an embodiment of the present disclosure. This first apparatus 1 comprises a first receiving means 11 and a first sending means 12.

The first receiving means 11 is used to receive an OMCI message sent by a cloud server. In some embodiments, the OMCI message sent by the cloud server may be an OMCI message that does not carry valid device association information that requires device assistance, or it may be a normal OMCI message; for example, the cloud server generates an OLT-G that does not carry valid superframe and ToD (Time of Day) information, and sends the OLT-G that does not carry valid superframe and ToD information to the OLT through the interface between the cloud server and the OLT, the first receiving means 11 in the OLT receives the OLT-G. In some embodiments, the corresponding field in the OMCI message requiring device assistance generated by the cloud server carries invalid device association information or other invalid information; in some embodiments, the corresponding field in the OMCI message associated with the device information of the OLT generated by the cloud server is empty. In some embodiments, there is only one interface between the cloud server and the OLT for the transmission of OMCI messages, and this interface is used to transmit all OMCI messages; in some embodiments, there is a first interface for transmitting normal OMCI messages and a second interface for transmitting OMCI messages requiring device assistance between the cloud server and the OLT.

The first sending means 12 is used to judge whether the received OMCI message is associated with the device information of the optical line terminal, if so, obtains device association information corresponding to the received OMCI message, fills the device association information into the received OMCI message, and sends the filled OMCI message to the optical network terminal, otherwise, sends the received OMCI message directly to the optical network terminal. In some embodiments, the corresponding field in the OMCI message requiring device assistance generated by the cloud server carries invalid device association information or other invalid information, after the first receiving means 11 receives the OMCI message, the first sending means 12, if determines that the OMCI message is associated with the device information of the optical line terminal, obtains valid device association information and fills into the corresponding field (that is, equivalent to replacing the original invalid information); in some embodiments, the corresponding field in the OMCI message requiring device assistance generated by the cloud server is empty, after the first receiving means 11 receives the OMCI message, the first sending means 12, if determines that the OMCI message is associated with the device information of the optical line terminal, obtains valid device association information and fills into the corresponding field. In some embodiments, the first sending means 12 obtains the device association information required by the OMCI message associated with the device information of the OLT from the hardware adapter (HW Adaptor) in the OLT, and the hardware adapter may obtain the required device association information from the corresponding hardware, for example, the first receiving means 11 receives an OLT-G that does not carry valid superframe and ToD information sent by the cloud server, the first sending means 12, after recognizing that the OLT-G is an OMCI message requiring device assistance, obtains the superframe and ToD information from the hardware adapter to fill the OLT-G, the hardware adapter obtains that superframe and ToD information from the ToD hardware. In some embodiments, judging whether the received OMCI message is associated with the device information of the optical line terminal, if so, it is handed over to a specific module to perform the filling operation on the OMCI message to send the filled OMCI message to the ONT through the vOMCI hardware path, otherwise, the OMCI message is sent directly to the ONT through the vOMCI hardware path. It should be noted that when the OMCI message carrying valid device association information leaves the OLT after the filling is completed, it follows the same path as all other normal OMCI messages. Therein, the OLT may use any feasible means to judge whether the received OMCI message is associated with the device information of the OLT; for example, judge whether the OMCI message is associated with the device information of the OLT through the interface source of the OMCI message; for another example, by defining a new attribute in the OMCI message to indicate whether it is associated with the device information of the OLT, then can judge whether the OMCI message is associated with the device information of the OLT by identifying the attribute in the OMCI message; for another example, the content of the OMCI message may be parsed to identify whether it is associated with the device information of the OLT. In these embodiments, since the device association information is sent directly to the ONT after being filled by the OLT, it can be consistent with the timing of the device-based OMCI function, which proves that the timing requirements of G.984.3, G.987.3, G.989.3 are met, and since all OMCI messages are generated through vOMCI, the integrity of the OMCI stack is well maintained.

In some embodiments, there is a first interface for transmitting OMCI messages that are not associated with the device information of the optical line terminal and a second interface for transmitting OMCI messages associated with the device information of the optical line terminal between the optical line terminal and the cloud server, the judging whether the received OMCI message is associated with device information of the optical line terminal, comprising: determining, if the received OMCI message is from the second interface, that the received OMCI message is associated with the device information of the optical line terminal; determining, if the received OMCI message is from the first interface, that the received OMCI message is not associated with the device information of the optical line terminal. In these embodiments, a new second interface is introduced between the vOMCI and the pOLT (Physical OLT), which will be used for OMCI messages dependent on the OLT when the OMCI messages (such as OLT-G) need the help of the OLT.

In some embodiments, the judging whether the received OMCI message is associated with device information of the optical line terminal, comprising: judging whether the received OMCI message is associated with device information of the optical line terminal by analyzing the content information in the received OMCI message. As an example, the cloud server sends the OMCI message generated by the cloud server to the OLT through an interface between the cloud server and the OLT, after receiving the OMCI message, the OLT recognizes that the OMCI message is an OLT-G by checking its content, and then determines that the OMCI message is associated with the device information of the OLT.

In some embodiments, the obtaining device association information corresponding to the received OMCI message, filling the device association information into the received OMCI message, and sending the filled OMCI message to the optical network terminal, comprising: obtaining, if the received OMCI message is an OLT-G that does not valid superframe and ToD information, valid superframe and ToD information corresponding to the OLT-G, filling the valid superframe and ToD information into the OLT-G, and sending the filled OLT-G to the optical network terminal. In some embodiments, the valid superframe and ToD information refers to the specified superframe information (GEM or XGEM superframe information) and ToD information required by the OLT-G, and the filled OLT-G carries the valid superframe and ToD information.

In some embodiments, the first sending means 12 is used for: judging whether the received OMCI message is associated with device information of the optical line terminal by a vOMCI adapter, if so, transmitting the received OMCI message from the vOMCI adapter to an OMCI assistor, obtaining the device association information corresponding to the received OMCI message from a hardware adapter module by the OMCI assistor, and filling the device association information into the received OMCI message, and sending the filled OMCI message to the optical network terminal via the vOMCI hardware path, otherwise sending the received OMCI message directly to the optical network terminal through vOMCI hardware path, wherein the vOMCI adapter has the function of receiving and adapting OMCI message, wherein the OMCI assistor is designed to receive OMCI messages requiring device assistance sent by the vOMCI adapter, fill these OMCI messages, and then send the filled OMCI messages to be sent to the vOMCI normal path, by introducing a new OMCI assistor in the OLT, the corresponding device association information can be filled into the OMCI messages requiring device assistance in the OLT, thereby ensuring that timing requirements are met and the integrity of the vOMCI can be maintained; in some embodiments, the aforementioned controller in the OLT can also be designed as an OMCI assistor. In some embodiments, the hardware adapter module is used to obtain the required device association information from the corresponding hardware of the OLT and provide it to the OMCI assistor, such as obtaining the superframe and ToD information from the ToD hardware and provide it to the OMCI assistor, so that the OMCI assistor fills the superframe and ToD information into the OLT-G. In some embodiments, the vOMCI hardware path is OMCC (Optical Network Unit Management and Control Channel) on the OLT.

In some embodiments, a PON buffer is deployed in the OMCI assistor, the device association information corresponding to a plurality of OMCIs is obtained by batch processing the plurality of OMCI messages in the PON buffer, so as to fill the plurality of OMCI messages in batches. By deploying the buffer of each PON in the OMCI assistor, large size and burst OMCI messages requiring device assistance can be processed, for example, when there are a large number of burst OLT-G in the PON buffer, the batch retrieval function can be used to obtain the superframe and ToD information corresponding to the OLT-G messages, and to complete the filling for the OLT-G.

Figure 6:
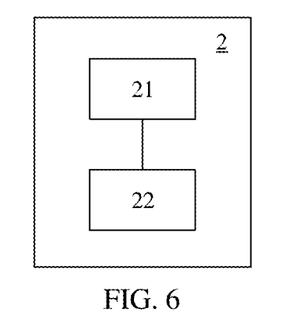
FIG. 6 shows a structural diagram of a second apparatus for transmitting OMCI messages in a cloud server according to an embodiment of the present disclosure.

FIG. 6 shows a structural diagram of a second apparatus for transmitting OMCI messages in a cloud server according to an embodiment of the present disclosure. The cloud server is deployed with a complete OMCI protocol stack to support virtual vOMCI function. The second apparatus 2 of this embodiment comprises a generating means 21 and a second sending means 22. The generating means 21 is used to generate an OMCI message, wherein, if the OMCI message is associated with the device information of the optical line terminal, the OMCI message does not carry valid device association information associated with the device information of the optical line terminal; the second sending means 22 is used to send the OMCI message to the optical line terminal.

The generating means 21 generates an OMCI message, wherein, if the OMCI message is associated with the device information of the optical line terminal, the OMCI message does not carry valid device association information associated with the device information of the optical line terminal.

In some embodiments, the cloud server includes all MEs supported by the OMCI protocol, the generating means 21 may generate OMCI messages that do not carry valid device association information based on MEs associated with the device information of the OLT, so as to fill the OMCI messages in the OLT, or the generating means 21 may also generate normal OMCI messages based on MEs that are not associated with the device information of the OLT, for example, the generating means 21 periodically generates OLT-G OMCI messages for the ONT to enable the ToD function at a fixed (or configurable) frequency. In some embodiments, the corresponding field in the OMCI message associated with the device information of the OLT which is generated by the generating means 21 carries invalid device association information or other invalid information. In some embodiments, the corresponding field in the OMCI message associated with the device information of the OLT which is generated by the generating means 21 is empty. In some embodiments, for MEs associated with OLT, if such MEs are also deployed in OLT (i.e., the OLT also has the ability to generate corresponding OMCI messages based on such MEs), the generating means 21 may determine whether the corresponding OMCI message is generated by the cloud server or by the OLT based on its settings information or preset database or negotiation results with the OLT.

In some embodiments, the OMCI message is an OLT-G that does not carry valid superframe and ToD information, the generating means 21 generates an OLT-G that does not carry valid superframe and ToD information, and the OLT fills the valid superframe and ToD information into the OLT-G after receiving the OLT-G.

The second sending means 22 sends the OMCI messages to the optical line terminal.

In some embodiments, there is only one interface between the cloud server and the OLT for transmitting OMCI messages, which is used for transmitting all OMCI messages, that is, normal OMCI messages or OMCI messages requiring OLT assistance are sent to the OLT through this interface.

In some embodiments, there is a first interface for transmitting OMCI messages that are not associated with the device information of the optical line terminal and a second interface for transmitting OMCI messages associated with the device information of the optical line terminal between the optical line terminal and the cloud server, the second sending means 22 is used for: if the OMCI message is associated with the device information of the optical line terminal, sending the OMCI message to the optical line terminal via the second interface, otherwise sending the OMCI message to the optical line terminal via the first interface. In some embodiments, the second sending means 22 identifies whether the OMCI message is associated with the device information of the OLT according to the content of the OMCI message; in some embodiments, the second sending means 22 determines whether the OMCI message is associated with the device information of the OLT by querying a preset database.

According to the solution of this disclosure, for OMCI messages requiring OLT assistance, by generating OMCI messages that do not carry valid device association information in the cloud server and filling the corresponding device association information into the OMCI messages in the OLT, the integrity of the vOMCI can be maintained and it is ensured that all OMCI messages can reach the ONT before a specific superframe reaches the ONT, thereby meeting the timing requirements.

It should be noted that the system to which the technical solution of the present disclosure is applicable may be a GPON system or a next-generation passive optical network (such as XGPON), or any other passive optical network system that adopts OMCI mode for management and control.

Figure 7:
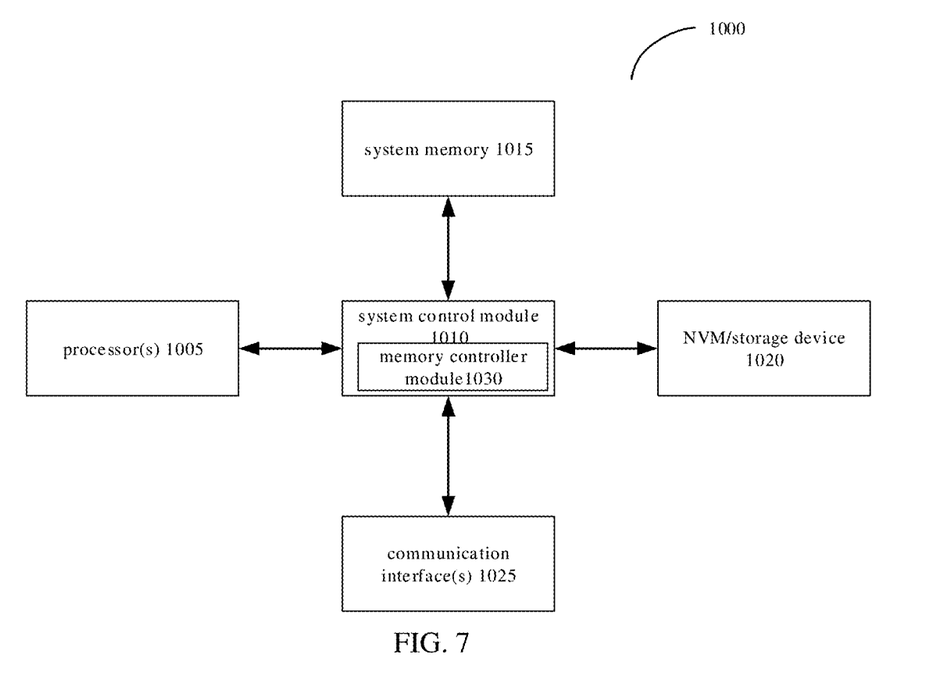
FIG. 7 shows an exemplary system that may be used to implement various embodiments described in the present disclosure.

FIG. 7 shows an exemplary system that may be used to implement various embodiments described in the present disclosure.

In some embodiments, the system 1000 can be used as any processing device in the embodiments of the present disclosure. In some embodiments, system 1000 may include one or more computer readable media (e.g., system memory or NVM/storage device 1020) having instructions and one or more processors (e.g., processor(s) 1005) coupled with the one or more computer readable media and configured to execute the instructions to implement modules to perform the actions described in the present disclosure.

For one embodiment, system control module 1010 may include any suitable interface controller to provide any suitable interface to at least one of processor(s) 1005 and/or to any suitable device or component in communication with system control module 1010.

The system control module 1010 may include a memory controller module 1030 to provide an interface to the system memory 1015. Memory controller module 1030 may be a hardware module, a software module, and/or a firmware module.

System memory 1015 may be used to load and store data and/or instructions, for example, for system 1000. For one embodiment, system memory 1015 may include any suitable volatile memory, such as suitable DRAM. In some embodiments, system memory 1015 may include a Double Data Rate type Fourth Synchronous Dynamic Random Access Memory (DDR4 SDRAM).

For one embodiment, system control module 1010 may include one or more input/output (I/O) controllers to provide an interface to NVM/storage device 1020 and communication interface(s) 1025.

For example, NVM/storage device 1020 may be used to store data and/or instructions. NVM/storage device 1020 may include any suitable non-volatile memory (e.g., flash memory) and/or may include any suitable non-volatile storage device(s) (e.g., one or more hard disk drives (HDD), one or more Compact Disc (CD) drives, and/or one or more Digital Versatile Disc (DVD) drives).

NVM/storage device 1020 may include storage resources that are physically part of the device on which system 1000 is installed, or it may be accessible by the device and not necessarily to be part of the device. For example, NVM/storage device 1020 may be accessed via the communication interface(s) 1025 through the network.

Communication interface(s) 1025 may provide an interface for system 1000 to communicate via one or more networks and/or with any other suitable devices. System 1000 may wirelessly communicate with one or more components of a wireless network according to any of one or more wireless network standards and/or protocols.

For one embodiment, at least one of the processor(s) 1005 may be packaged together with logic for one or more controller(s) (e.g., memory controller module 1030) of the system control module 1010. For one embodiment, at least one of the processor(s) 1005 may be packaged together with logic for one or more controller(s) of the system control module 1010 to form a System in Package (SiP). For one embodiment, at least one of the processor(s) 1005 may be integrated with logic for one or more controller(s) of the system control module 1010 on the same mold. For one embodiment, at least one of the processor(s) 1005 may be integrated with logic for one or more controller(s) of system control module 1010 on the same mold to form a system on chip (SoC).

In various embodiments, the system 1000 may be, but is not limited to being: a server, a workstation, a desktop computing device, or a mobile computing device (for example, a laptop computing device, a handheld computing device, a tablet, a netbook, etc.). In various embodiments, the system 1000 may have more or fewer components and/or different architectures. For example, in some embodiments, the system 1000 includes one or more cameras, a keyboard, a Liquid Crystal Display (LCD) screen (including a touch screen display), a non-volatile memory port, multiple antennas, a graphics chip, an Application Specific Integrated Circuit (ASIC), and speakers.

The present disclosure also provides an optical line terminal, wherein the optical line terminal comprises:
a memory for storing one or more programs;
one or more processors connected with the memory,
the one or more programs, when executed by the one or more processors, cause the one or more processors to perform the method for transmitting OMCI messages as described in the present disclosure.

The present disclosure also provides a cloud server, wherein the cloud server comprises:
a memory for storing one or more programs;
one or more processors connected with the memory,
the one or more programs, when executed by the one or more processors, cause the one or more processors to perform the method for transmitting OMCI messages as described in the present disclosure.

The present disclosure also provides a computer readable storage medium storing a computer program, which when executed by a processor, cause the processor to perform the method for transmitting OMCI messages as described in the present disclosure.

The present disclosure also provides a computer program product, which when executed by a device, cause the device to perform the method for transmitting OMCI messages as described in the present disclosure.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

The invention claimed is:

1. A method for transmitting OMCI messages in an optical line terminal, wherein the method comprises:
receiving an OMCI message from a cloud server, wherein the cloud server supports vOMCI;
judging whether the received OMCI message is associated with device information of the optical line terminal, if so, obtaining device association information corresponding to the received OMCI message, filling the device association information into the received OMCI message, and sending the filled OMCI message to the optical network terminal, otherwise, sending the received OMCI message directly to the optical network terminal.

2. The method according to claim 1, wherein there is a first interface for transmitting OMCI messages that are not associated with the device information of the optical line terminal and a second interface for transmitting OMCI messages associated with the device information of the optical line terminal between the optical line terminal and the cloud server, the judging whether the received OMCI message is associated with device information of the optical line terminal, comprising:
determining, if the received OMCI message is from the second interface, that the received OMCI message is associated with the device information of the optical line terminal; determining, if the received OMCI message is from the first interface, that the received OMCI message is not associated with the device information of the optical line terminal.

3. The method according to claim 1, wherein the judging whether the received OMCI message is associated with device information of the optical line terminal, comprising:
judging whether the received OMCI message is associated with device information of the optical line terminal by analyzing the content information in the received OMCI message.

4. The method according to claim 1, wherein the obtaining device association information corresponding to the received OMCI message, filling the device association information into the received OMCI message, and sending the filled OMCI message to the optical network terminal, comprising:
obtaining, if the received OMCI message is an OLT-G that does not valid superframe and ToD information, valid superframe and ToD information corresponding to the OLT-G, filling the valid superframe and ToD information into the OLT-G, and sending the filled OLT-G to the optical network terminal.

5. The method according to claim 1, wherein the judging whether the received OMCI message is associated with device information of the optical line terminal, if so, obtaining device association information corresponding to the received OMCI message, filling the device association information into the received OMCI message, and sending the filled obtained OMCI message to the optical network terminal, otherwise, sending the received OMCI message directly to the optical network terminal, comprising:
judging whether the received OMCI message is associated with device information of the optical line terminal by a vOMCI adapter, if so, transmitting the received OMCI message from the vOMCI adapter to an OMCI assistor, obtaining the device association information corresponding to the received OMCI message from a hardware adapter module by the OMCI assistor, and filling the device association information into the received OMCI message, and sending the filled OMCI message to the optical network terminal via the vOMCI hardware path, otherwise sending the received OMCI message directly to the optical network terminal through vOMCI hardware path.

6. The method according to claim 5, wherein a PON buffer is deployed in the OMCI assistor, the device association information corresponding to a plurality of OMCIs is obtained by batch processing the plurality of OMCI messages in the PON buffer, so as to fill the plurality of OMCI messages in batches.

7. A method for transmitting OMCI messages in a cloud server, the cloud server supports vOMCI, wherein the method comprises:
  generating an OMCI message, wherein, if the OMCI message is associated with device information of the optical line terminal, the OMCI message does not carry valid device association information associated with the device information of the optical line terminal;
  sending the OMCI message to the optical line terminal.

8. The method according to claim 7, wherein the OMCI message is an OLT-G that does not carry valid superframe and ToD information.

9. The method according to claim 7, wherein there is a first interface for transmitting OMCI messages that are not associated with the device information of the optical line terminal and a second interface for transmitting OMCI messages associated with the device information of the optical line terminal between the optical line terminal and the cloud server, the sending the OMCI message to the optical line terminal, comprising:
  sending, if the OMCI message is associated the device information of the optical line terminal, the OMCI message to the optical line terminal via the second interface, otherwise sending the OMCI message to the optical line terminal via the first interface.

10. An optical line terminal, wherein the optical line terminal comprises:
  a memory for storing one or more programs;
  one or more processors connected with the memory,
  the one or more programs, when executed by the one or more processors, cause the one or more processors to perform the following operations:
  receiving an OMCI message from a cloud server, wherein the cloud server supports vOMCI;
  judging whether the received OMCI message is associated with device information of the optical line terminal, if so, obtaining device association information corresponding to the received OMCI message, filling the device association information into the received OMCI message, and sending the filled OMCI message to the optical network terminal, otherwise, sending the received OMCI message directly to the optical network terminal.

11. A cloud server, wherein the cloud server comprises:
  a memory for storing one or more programs;
  one or more processors connected with the memory,
  the one or more programs, when executed by the one or more processors, cause the one or more processors to perform the following operations:
  generating an OMCI message, wherein, if the OMCI message is associated with device information of the optical line terminal, the OMCI message does not carry valid device association information associated with the device information of the optical line terminal;
  sending the OMCI message to the optical line terminal.

* * * * *